US009147111B2

(12) United States Patent
Fleck et al.

(10) Patent No.: US 9,147,111 B2
(45) Date of Patent: Sep. 29, 2015

(54) DISPLAY WITH BLOCKING IMAGE GENERATION

(75) Inventors: Rod G. Fleck, Bellevue, WA (US); David D. Bohn, Fort Collins, CO (US); Stephen Latta, Seattle, WA (US); Julia Meinershagen, Seattle, WA (US); Sebastian Sylvan, Seattle, WA (US); Brian McDowell, Woodinville, WA (US); Jeff Cole, Seattle, WA (US); Jeffrey Alan Kohler, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 95 days.

(21) Appl. No.: 13/371,129

(22) Filed: Feb. 10, 2012

(65) Prior Publication Data
US 2013/0208014 A1 Aug. 15, 2013

(51) Int. Cl.
*G09G 5/02* (2006.01)
*G09G 5/00* (2006.01)
*G06K 9/00* (2006.01)

(52) U.S. Cl.
CPC .................................. *G06K 9/00684* (2013.01)

(58) Field of Classification Search
CPC ................ G09G 5/00; G09G 2380/02; G09G 2310/0267; G09G 2310/0275; G09G 2320/0261; G09G 2340/12; G09G 2354/00; G09G 3/002; G09G 3/3413; G09G 3/344; G09G 3/3446; G09G 5/003; G09G 5/12; G09G 5/14; G02B 27/017; G02B 6/0053; G06K 9/00684; G03F 1/00; G03F 1/36; G06F 19/3406; G06F 3/013

USPC ...................................... 345/592, 617, 672, 8
See application file for complete search history.

(56) References Cited

U.S. PATENT DOCUMENTS

| 5,175,637 | A | 12/1992 | Jones et al. |
| 5,367,390 | A | 11/1994 | Scheffer et al. |
| 6,220,711 | B1 | 4/2001 | Melville |
| 6,481,851 | B1 | 11/2002 | McNelley et al. |
| 6,956,582 | B2 * | 10/2005 | Tidwell .......................... 345/611 |
| 7,146,059 | B1 * | 12/2006 | Durand et al. ................ 382/260 |
| 7,687,989 | B2 * | 3/2010 | Cok .............................. 313/506 |
| 8,289,274 | B2 * | 10/2012 | Sliwa et al. .................... 345/108 |

(Continued)

OTHER PUBLICATIONS

Marshall, The Index of Cognitive Activity: Measuring Cognitive Workload, 2002, IEEE 7' Human Factors Meeting, 0-7803-7450-9, p. 1-7.*

(Continued)

*Primary Examiner* — Jason M Repko
*Assistant Examiner* — Yuehan Wang
(74) *Attorney, Agent, or Firm* — Jeremy Snodgrass; Judy Yee; Micky Minhas

(57) ABSTRACT

A blocking image generating system and related methods include a head-mounted display device having an opacity layer. A method may include receiving a virtual image to be presented by display optics in the head-mounted display device. Lighting information and an eye-position parameter may be received from an optical sensor system in the head-mounted display device. A blocking image may be generated in the opacity layer of the head-mounted display device based on the lighting information and the virtual image. The location of the blocking image in the opacity layer may be adjusted based on the eye-position parameter.

18 Claims, 8 Drawing Sheets

(56) References Cited

U.S. PATENT DOCUMENTS

| | | |
|---|---|---|
| 2010/0067116 A1 | 3/2010 | Lee et al. |
| 2011/0213664 A1* | 9/2011 | Osterhout et al. ......... 705/14.58 |
| 2011/0248904 A1* | 10/2011 | Miyawaki et al. ................ 345/7 |
| 2012/0019645 A1* | 1/2012 | Maltz .............................. 348/78 |
| 2012/0068913 A1* | 3/2012 | Bar-Zeev et al. ................. 345/8 |
| 2012/0092328 A1* | 4/2012 | Flaks et al. .................... 345/419 |
| 2012/0113092 A1* | 5/2012 | Bar-Zeev et al. ............. 345/419 |
| 2012/0154277 A1* | 6/2012 | Bar-Zeev et al. ............. 345/158 |
| 2013/0044129 A1* | 2/2013 | Latta et al. .................... 345/633 |
| 2013/0044130 A1* | 2/2013 | Geisner et al. ................ 345/633 |
| 2013/0114043 A1* | 5/2013 | Balan et al. ................... 351/210 |

OTHER PUBLICATIONS

Beatty et al., The Pupillary System, 2000, Handbook of Psychophsiology, 2nd ed., Cambridge University Press, ISBN 62634X, p. 142-162.*

"OpenGL Programming Guide", Retrieved at <<http://glprogramming.com/red/chapter04.html>>, Retrieved Date: Sep. 12, 2011, pp. 12.

* cited by examiner

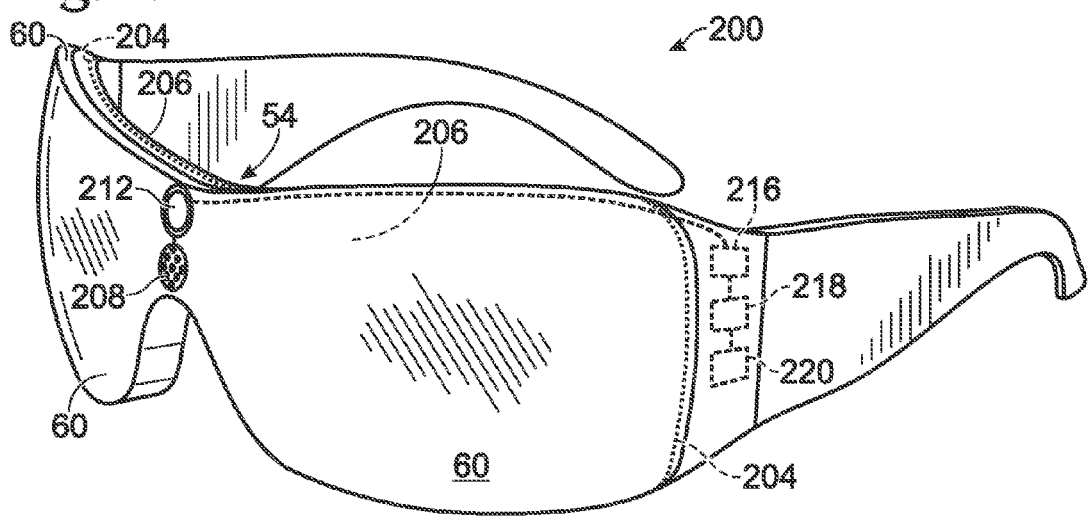
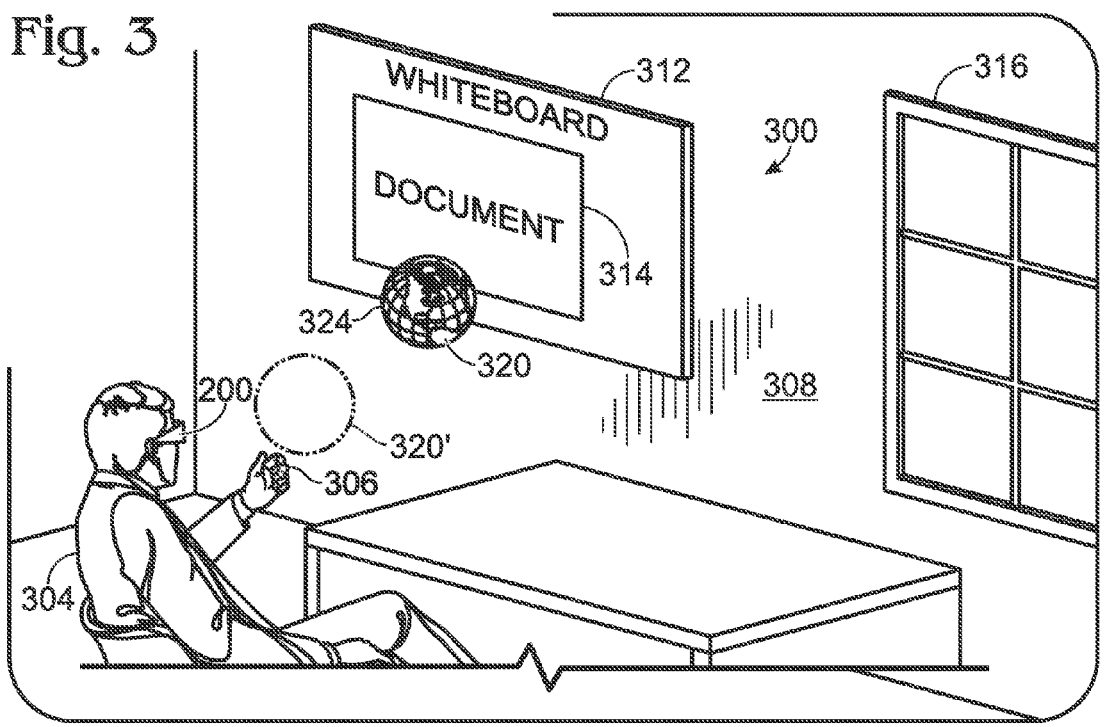

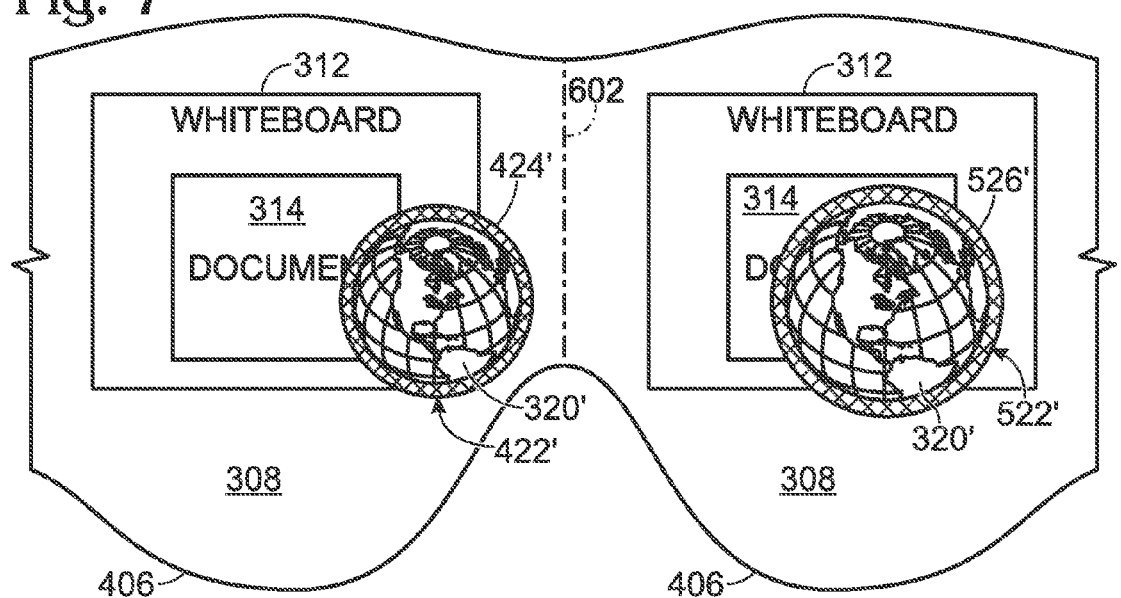
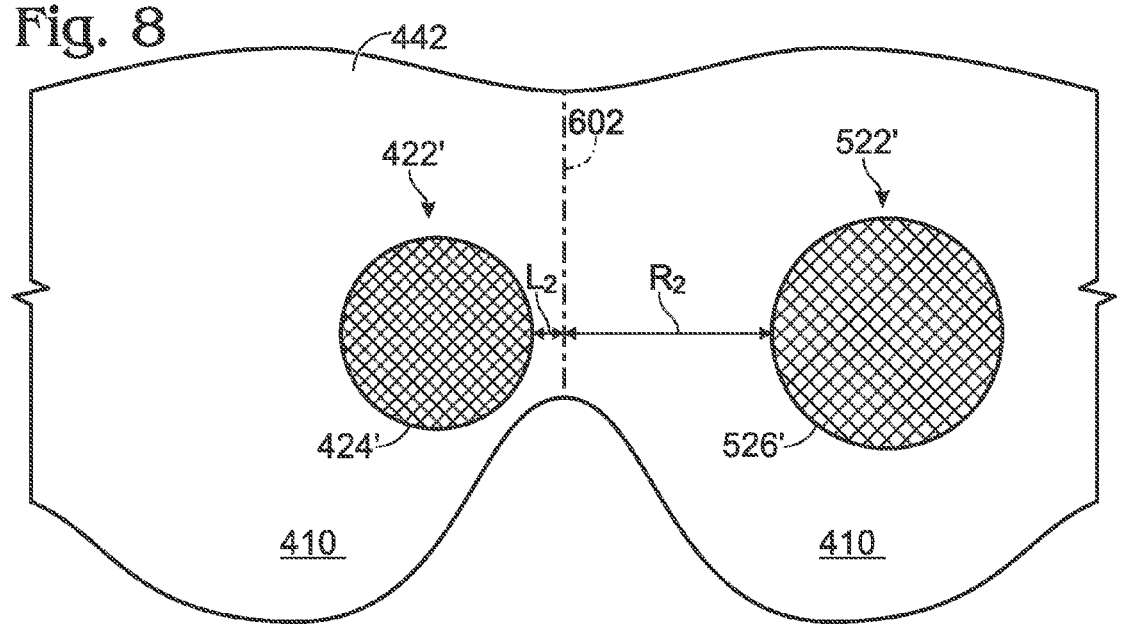

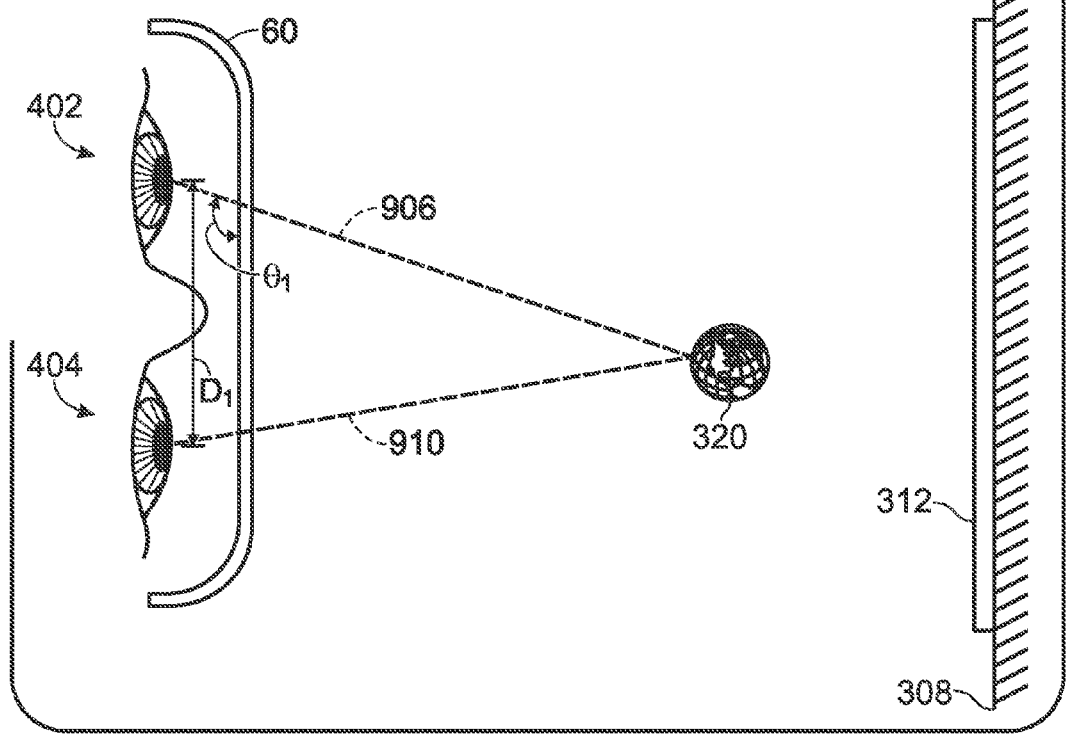
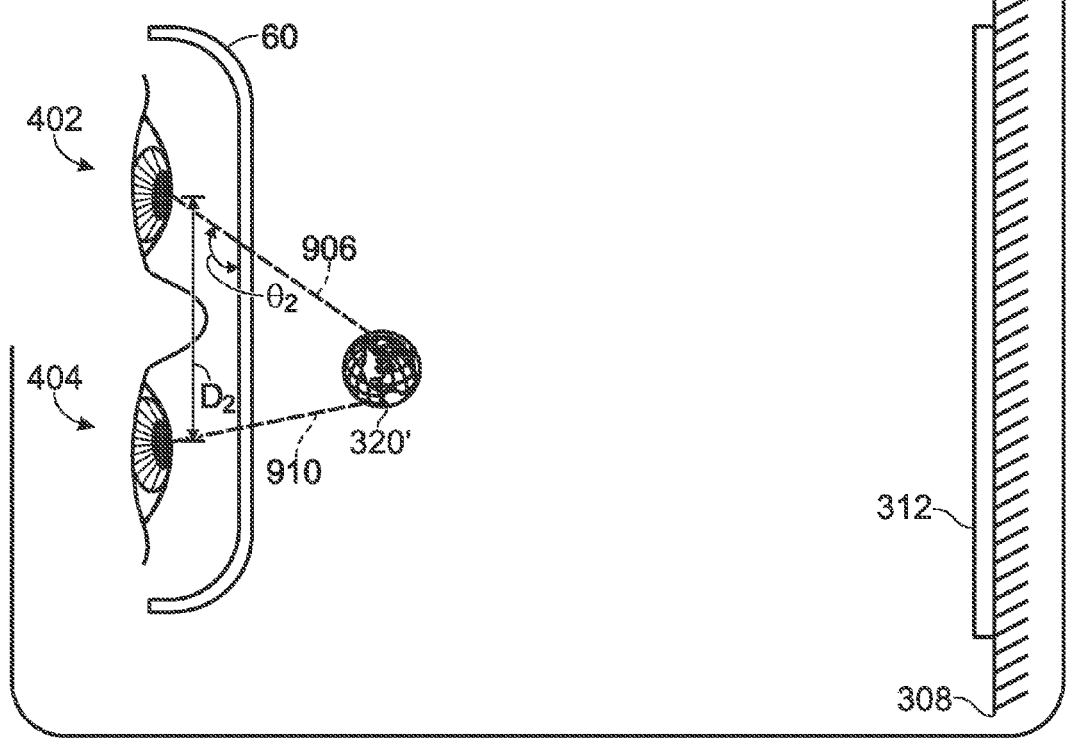

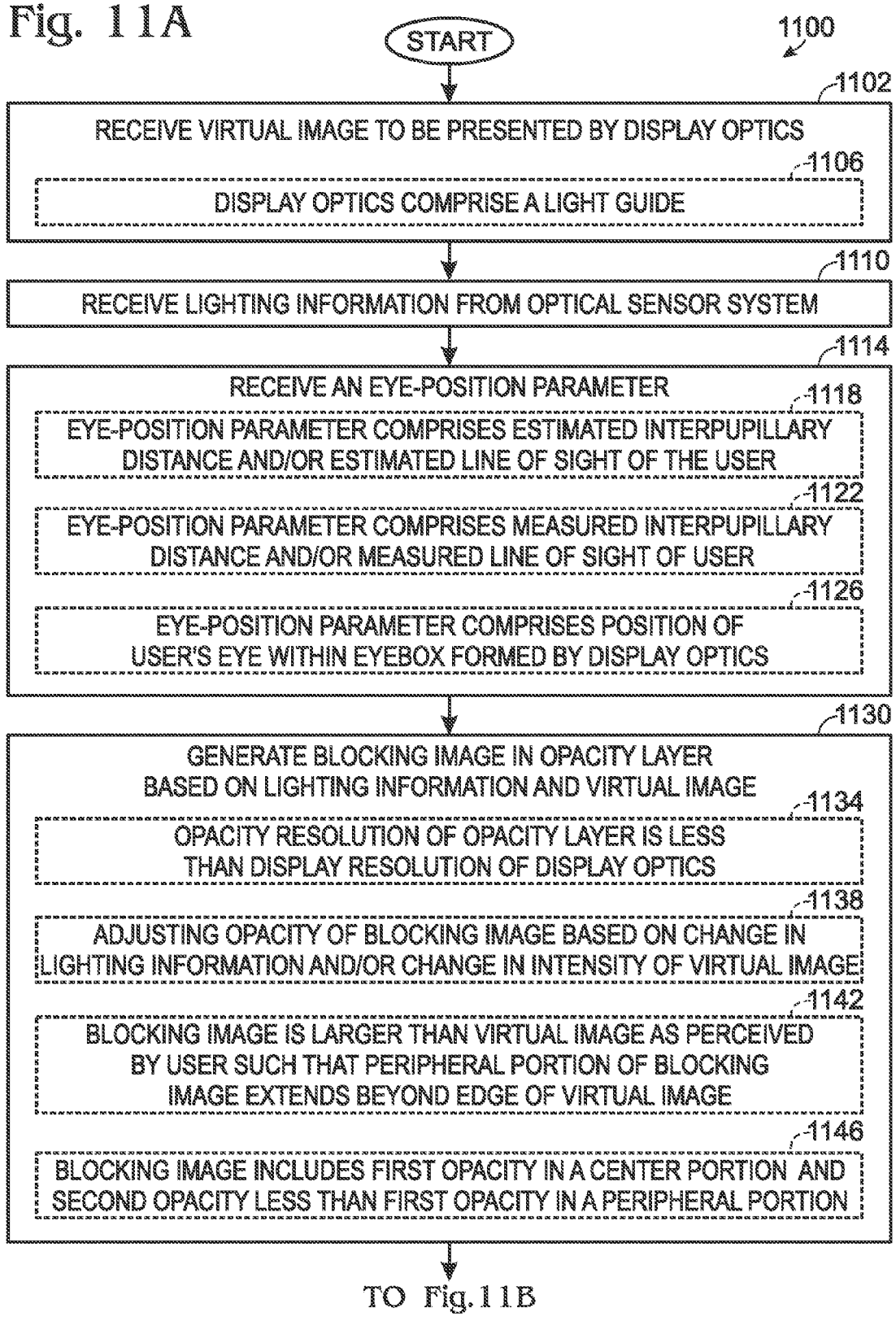

DISPLAY WITH BLOCKING IMAGE GENERATION

BACKGROUND

Augmented reality may refer to a view of a physical, real-world environment that is augmented with the addition of virtual content. In one example, a head-mounted display device with a near-eye transparent display screen may allow a user to view a real-world environment through the display. One or more two-dimensional (2D) or three-dimensional (3D) virtual objects may be presented to the user via the transparent display of the head-mounted display device in a manner that augments the user's view of the real-world environment to create an augmented reality virtual environment.

It can prove challenging to provide users with a realistic and believable augmented reality experience using transparent displays. In some cases, such as when a high contrast real-world object is located behind a 3D virtual image, the virtual image may appear to be see-through, 2D, and/or less than realistic to a user. To address these issues, the intensity or brightness of the virtual image may be increased. However, displaying a brighter virtual image uses more power, and correspondingly larger and more expensive power supply components are needed. Further, some ambient conditions may include very bright light, such as a ski slope in bright sun. In such conditions, increasing the intensity of a virtual image in front of the very bright background may be impractical and insufficient to meaningfully address the above issues.

SUMMARY

To address the above issues, a blocking image generating system including a head-mounted display device having an opacity layer and related methods are provided. In one example, a method may include receiving a virtual image to be presented by display optics in the head-mounted display device. Lighting information and an eye-position parameter may be received from the head-mounted display device. The method may include generating a blocking image in the opacity layer of the head-mounted display device based on the lighting information and the virtual image. The location of the blocking image in the opacity layer may be adjusted based on the eye-position parameter.

In another example, a method may be directed to enhancing a visual contrast between a virtual image and a physical environment that includes real-world light. The method may include receiving lighting information via an optical sensor system in a head-mounted display device that includes at least one opacity layer. The method may also include rendering the virtual image via display optics in the head-mounted display device.

A global region of the opacity layer may be activated to block a first percentage of the real-world light from reaching the eye of a user. A local region of the opacity layer (or of a separate opacity layer) may also be activated to generate a blocking image that blocks a second percentage of the real-world light from reaching the eye of the user. The local region may be smaller than the global region and may correspond to the virtual image. Additionally, the second percentage of real-world light that is blocked in the local region may be greater than the first percentage of real-world light that is blocked in the global region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an example head-mounted display device according to an embodiment of the present disclosure.

FIG. 3 is a schematic view of a user in a physical environment wearing the head-mounted display device of FIG. 2 according to an embodiment of the present disclosure.

FIG. 7 is a schematic view of the physical environment of FIG. 3 as seen through the head-mounted display device of FIG. 3 and showing the virtual globe in a second position.

FIG. 8 is a schematic view of the opacity layer in the head-mounted display device of FIG. 7.

FIG. 9 is a schematic view of the user's eyes in FIG. 3 viewing the virtual globe in the first position.

FIG. 10 is a schematic view of the user's eyes in FIG. 3 viewing the virtual globe in the second position.

FIGS. 11A and 11B are a flow chart of a method for adjusting a location of a blocking image according to an embodiment of the present disclosure.

DETAILED DESCRIPTION

Figure 1:
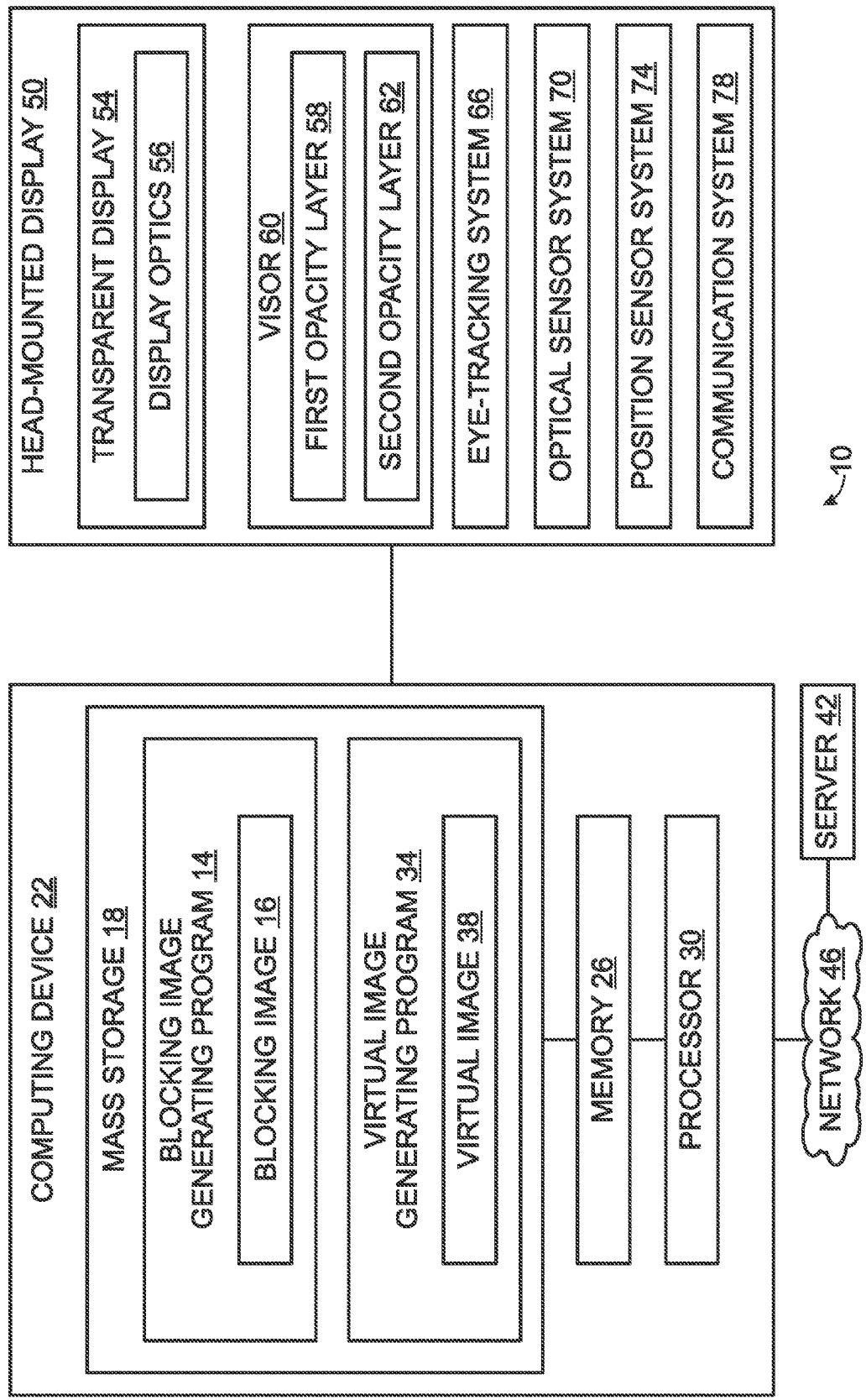
FIG. 1 is a schematic view of a blocking image generating system according to an embodiment of the present disclosure.

FIG. 1 shows a schematic view of one embodiment of a blocking image generating system 10 for blocking a portion of real-world light from reaching eyes of a user wearing a head-mounted display (HMD) device 50. The blocking image generating system 10 includes a blocking image generating program 14 that may be stored in mass storage 18 of a computing device 22. The blocking image generating program 14 may be loaded into memory 26 and executed by a processor 30 of the computing device 22 to perform one or more of the methods and processes described in more detail below. As described in more detail below, the blocking image generating program 14 may generate one or more blocking images 16.

A virtual image generating program 34 may also be stored in mass storage 18 of the computing device 22. The virtual image generating program 34 may generate a virtual image 38 that may be presented via the transparent display 54 of the HMD device 50, as described in more detail below. In another example, the blocking image generating program 14 and/or the virtual image generating program 34 may be stored remotely, such as on a remote server 42 accessed via network 46 to which the computing device 22 is operatively connected. Network 46 may take the form of a local area network (LAN), wide area network (WAN), wired network, wireless network, personal area network, or a combination thereof, and may include the Internet.

The computing device 22 may take the form of a desktop computing device, a mobile computing device such as a smart phone, laptop, notebook or tablet computer, mobile communications device such as a mobile phone, network computer, home entertainment computer, interactive television, gaming system, or other suitable type of computing device. Additional details regarding the components and computing aspects of the computing device 22 are described in more detail below with reference to FIG. 13.

The computing device 22 may be operatively connected with the HMD device 50 using a wired connection, or may employ a wireless connection via WiFi, Bluetooth, or any other suitable wireless communication protocol. Additionally, the example illustrated in FIG. 1 shows the computing device 22 as a separate component from the HMD device 50. It will be appreciated that in other examples the computing device 22 may be integrated into the HMD device 50.

FIG. 2 shows an example of an HMD device 200 in the form of a pair of wearable glasses that include a transparent display 54 and a visor 60. As discussed in more detail below, the visor 60 includes one or more opacity layers in which blocking images may be generated. In one example, the visor 60 may be integrally formed with the transparent display 54 in the form of, for example, one or more additional layers. In other examples, the visor 60 may separately mounted or attached adjacent to the transparent display 54.

It will be appreciated that the HMD device 200 may take other suitable forms in which a transparent or semi-transparent display is supported in front of a viewer's eye or eyes. It will also be appreciated that the HMD device 50 illustrated in FIG. 1 may take the form of the HMD device 200, as described in more detail below, or any other suitable HMD device.

With reference to FIGS. 1 and 2, in one example the transparent display 54 includes display optics 56 that enable virtual images to be presented to the eyes of a user. The transparent display 54 and associated display optics 56 may be configured to visually augment an appearance of a physical environment to a user viewing the physical environment through the transparent display. For example, the appearance of a physical environment may be augmented by graphical content (e.g., one or more pixels each having a respective color and brightness) that is presented via the display optics 56 of the transparent display 54.

In one example, the display optics 56 of the transparent display 54 may include a light modulator 204 on an edge of lenses 206 of the transparent display. In this example, the lenses 206 may serve as a light guide 406 (see FIG. 4) for delivering light from the light modulator 204 to the eyes of a user. Such a light guide 406 may enable a user to perceive a 3D virtual image located within a physical environment that the user is viewing, while also allowing the user to view real-world objects in the physical environment.

In another example, the display optics 56 of the transparent display 54 may be configured to enable a user to view a real-world object in the physical environment through one or more partially transparent pixels that are displaying a virtual image. For example, the display optics 56 of the transparent display 54 may include image-producing elements located within the lenses 206 (such as, for example, a see-through Organic Light-Emitting Diode (OLED) display).

As discussed in more detail below, the one or more opacity layers in the visor 60 may selectively block real-world light received from the physical environment before the light reaches an eye of a user wearing the HMD device 200. Advantageously, by selectively blocking real-world light, the one or more opacity layers may enhance the visual contrast between a virtual image and the physical environment within which the virtual image is perceived by the user. In one example and with reference again to FIG. 1, such blocking may be performed by a first opacity layer 58 located within the visor 60. In another example, the first opacity layer 58 and a second opacity layer 62 may cooperate to selectively block real-world light. A more detailed description of methods for selectively blocking real-world light is provided below.

The HMD device 200 may also include various systems and sensors. For example, the HMD device 200 may include an eye-tracking system 66 that utilizes at least one inward facing sensor 208. The inward facing sensor 208 may be an image sensor that is configured to acquire image data from a user's eyes in the form of one or more eye-position parameters. Provided the user has consented to the acquisition and use of this eye-position information, the eye-tracking system 66 may use this information to track the position and/or movement of the user's eyes. For example, the eye-tracking system 66 may track a position of a user's eye within an eyebox, measure or estimate the interpupillary distance (IPD) between the center of the pupils of a user's eyes, measure or estimate a distance from the center of the pupil of a user's eye to a center or midpoint of an HMD device 200, measure or estimate a line of sight of the user's eyes, and measure or estimate other eye-position parameters related to a user's eyes.

The HMD device 200 may also include an optical sensor system 70 that utilizes at least one outward facing sensor 212, such as an optical sensor. Outward facing sensor 212 may detect movements within its field of view, such as gesture-based inputs or other movements performed by a user or by a person within the field of view. Outward facing sensor 212 may also capture image information and depth information from a physical environment and real-world objects within the environment. For example, outward facing sensor 212 may include a depth camera, a visible light camera, an infrared light camera, and/or a position tracking camera. In some examples, outward facing sensor 212 may include one or more optical sensors for observing visible spectrum and/or infrared light from the lighting conditions in the physical environment.

It will be appreciated that the optical sensor system 70 may detect lighting information including, but not limited to, ambient light (an overall light value in a room or location), as well as spot lights, point lights, directional lights, etc. In this manner, color, direction, intensity falloff, and other properties of these lights and light sources may be determined. In other examples, the optical sensor system 70 may include an ambient light sensor which may be used to build a light map of a physical environment.

As noted above, the HMD device 200 may include depth sensing via one or more depth cameras. Time-resolved images from one or more of these depth cameras may be registered to each other and/or to images from another optical sensor such as a visible spectrum camera, and may be combined to yield depth-resolved video.

In some examples, a depth camera may take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

In other examples, a depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination. The integration times for the two or more depth cameras may differ, such that a pixel-resolved time-of-flight of the pulsed illumination, from the source to the scene and then to the depth cameras, is discernable from the relative amounts of light received in corresponding pixels of the two depth cameras. The HMD device 200 may also include an infrared projector to assist in structured light and/or time of flight depth analysis.

In other examples, gesture-based and other motion inputs from the user, persons and/or objects in the physical environment may also be detected via one or more depth cameras. For example, outward facing sensor 212 may include two or more optical sensors with known relative positions for creating depth images. Using motion results from these optical sensors with known relative positions, such depth images may evolve over time.

Outward facing sensor 212 may capture images of a physical environment, such as the physical environment 300 shown in FIG. 3, which may be provided as input to the blocking image generating program 14 and/or virtual image generating program 34. In one example, the virtual image generating program 34 may include a 3D modeling system that uses such input to generate a virtual environment that models the physical environment that is captured.

The HMD device 200 may also include a position sensor system 74 that utilizes one or more motion sensors 216 to enable position tracking and/or orientation sensing of the HMD device, and determine a position of the HMD device within a physical environment. Non-limiting examples of motion sensors include an accelerometer, a gyroscope, a compass, and an orientation sensor, which may be included as any combination or subcombination thereof.

As one example, position sensor system 74 may be configured as a six-axis or six-degree of freedom position sensor system. This example position sensor system may include, for example, three accelerometers and three gyroscopes to indicate or measure a change in location of the HMD device 200 within three-dimensional space along three orthogonal axes (e.g., x, y, z), and a change in an orientation of the HMD device about the three orthogonal axes (e.g., roll, pitch, yaw).

Position sensor system 74 may support other suitable positioning techniques, such as GPS or other global navigation systems. For example, position sensor system 74 may include a wireless receiver (e.g., a GPS receiver or cellular receiver) to receive wireless signals broadcast from satellites and/or terrestrial base stations. These wireless signals may be used to identify a geographic location of the HMD device 200.

Positioning information obtained from wireless signals received by the HMD device 200 may be combined with positioning information obtained from the motion sensors 216 to provide an indication of location and/or orientation of the HMD device 200. While specific examples of position sensor systems have been described, it will be appreciated that other suitable position sensor systems may also be used.

In other examples, the HMD device 200 may also include a communication system 78 that utilizes one or more transceivers 218 for broadcasting wireless signals such as Wi-Fi signals, Bluetooth signals, etc., and receiving such signals from other devices. These wireless signals may be used, for example, to exchange data and/or create networks among devices.

It will be understood that the sensors and other components described above and illustrated in FIG. 2 are shown by way of example. These examples are not intended to be limiting in any manner, as any other suitable sensors, components, and/or combination of sensors and components may be utilized.

The HMD device 200 may also include a controller 220 having a logic subsystem and a data-holding subsystem, discussed in more detail below with respect to FIG. 13, that are in communication with the various input and output devices of the HMD device. Briefly, the data-holding subsystem may include instructions that are executable by the logic subsystem, for example, to receive and forward inputs from the sensors to computing device 22 (in unprocessed or processed form) via a communication subsystem, and to present images to the user via the display optics 56.

It will be appreciated that the HMD device 200 described above is provided by way of example, and thus is not meant to be limiting. Therefore it is to be understood that the HMD device 200 may include additional and/or alternative sensors, cameras, input devices, output devices, etc. without departing from the scope of this disclosure. Further, the physical configuration of an HMD device 200 and its various sensors and subcomponents may take a variety of different forms without departing from the scope of this disclosure.

Figure 4:
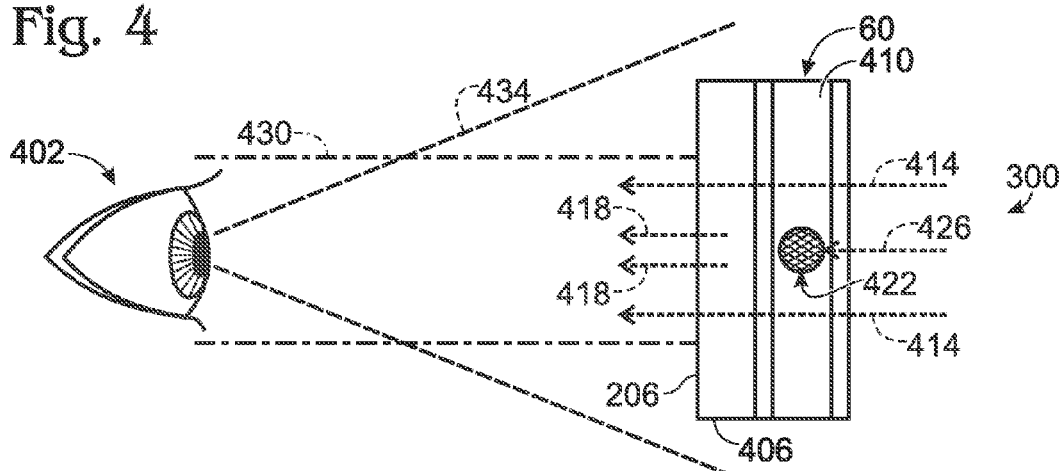
FIG. 4 is a schematic view of a user's eye looking toward display optics and an opacity layer of the head-mounted display device of FIG. 3 according to an embodiment of the present disclosure.

With reference now to FIGS. 3 and 4, a description of a user 304 wearing the HMD device 200 and viewing a physical environment 300 using one example of the blocking image generating system 10 will now be provided. FIG. 3 is a schematic illustration of the user 304 seated in the physical environment 300, which in this example is a room that includes a wall 308, a whiteboard 312 mounted on the wall, and a window 316. The display optics 56 of the HMD device 200 are presenting a virtual image to the eyes of the user 304 in the form of a virtual globe 320 in a first user-perceived location. As discussed in more detail below, the virtual image may be presented to the user 304 in other user-perceived locations, such as virtual globe 320' that represents a second user-perceived position of the globe.

With reference to FIG. 4, a left eye 402 of the user 304 is illustrated looking toward the light guide 406 of the display optics 56 and an adjacent opacity layer 410 that is located within the visor 60 of the head-mounted display device 200. In some examples, the opacity layer 410 may comprise a single opacity layer. In other examples, the opacity layer 410 may comprise two or more opacity layers that may be individually activated, as described in more detail below. It will be appreciated that FIG. 4 schematically illustrates the user's left eye 402, light guide 406, opacity layer 410 and visor 60 of the HMD device 200, and that other components and features of the HMD device are not shown.

A description of one example of the blocking image generating system 10 generating a blocking image that blocks a portion of real-world light from reaching the user's eyes will now be provided. For ease of description, the following refers to the left eye 402 of the user 304 as an example. It will be appreciated that the blocking image generating system 10 may generate blocking images for the user's right eye 404 (see FIGS. 5-10) in a similar manner.

As shown in FIG. 4, real-world light rays 414 may pass through the opacity layer 410 and light guide 406 on a path toward the user's eye 402. With reference also to FIG. 3, in this example the real-world light rays 414 may originate from the whiteboard 312, document 314 on the whiteboard, wall 308, window 316 and/or other objects or light sources within the physical environment 300. It will be appreciated that light rays 414 may also pass through the opacity layer 410 and light guide 406 at angles other than those illustrated.

The light guide 406 may emit display light rays 418 that also travel to the user's eye 402 and present the perception of a virtual image, such as the virtual globe 320, floating in the physical environment 300 beyond the HMD device 200 worn by the user 304. Display light rays 418 may also travel to the user's eye 402 at angles other than those shown.

As described in more detail below, the blocking image generating program 14 may generate a blocking image 422 in the opacity layer 410 to block a selected portion 426 of real-world light rays and thereby prevent such light from reaching the eye 402 of the user 304. For purposes of this description, the terms "block" and "blocking" include stopping, scattering and/or absorbing light rays. The blocking image 422 may also have various levels of opacity, thereby enabling the blocking image to block various portions 426 of the real-world light rays that impinge upon the blocking image.

In some examples, such blocked portions may range from approximately 100% of the impinging light to approximately 0% of the impinging light, including various percentages between 0% and 100%. For example, where a virtual image represents a solid object, such as the virtual globe 320, the blocking image generating program 14 may generate a blocking image 422 having approximately 100% opacity to block substantially all of the real-world light rays impinging upon the blocking image. In another example, where the virtual image represents a transparent or semi-transparent object, such as a tinted window, the blocking image generating program 14 may generate a blocking image having less than 100% opacity to block only a portion of the real-world light rays impinging upon the blocking image.

The blocking of real-world light by the opacity layer 410 may be performed locally in defined regions of the opacity layer, such as the region defined by the blocking image 422. Such blocking of real-world light may be performed on a pixel-by-pixel basis or on groups of pixels. The blocking of real-world light may also be performed globally across all, substantially all, or a significant portion of the opacity layer 410.

With reference also to FIG. 9, it will be appreciated that a user 304 will focus on various virtual images and real-world objects while wearing the HMD device 200. For example, the user 304 may focus on the virtual globe 320 that is perceived as floating a distance in front of the user's eyes 402, 404. Thus, the user's focal plane will be spaced some distance from the plane of the opacity layer 410. Accordingly, the blocking images generated in opacity layer 410 will be out-of-focus relative to the user's focal plane.

Materials that may be used in the opacity layer 410 include, but are not limited to, electrochromic materials that change from light to dark, and vice versa, with the application of a voltage or current. Electrochomic materials that may be used in the opacity layer 410 include, but are not limited to, redox materials and liquid crystal materials. Redox materials may include both organic and inorganic materials that change color based on a change in oxidation state through the exchange of electrons. Liquid crystal materials may include twisted nematic (TN) liquid crystals, polymer dispersed liquid crystals (PDLC), Cholesteric Liquid Crystal Display (CH-LCD) materials, and other suitable liquid crystal materials. Other opacity layers may include electrowetting light valves and microelectromechanical (MEMS) light valves.

As noted above, in some examples a single opacity layer may be used to provide real-world light blocking in a local region of the layer and/or in a global region of the layer. For example, a global region of the opacity layer may be activated to block a first amount of real-world light, and a local region of the layer may be activated to block a second, greater amount of real-world light to create more contrast in the local region as compared to the global region. In other examples, two or more opacity layers may be utilized to provide real-world light blocking in a local region of one layer and in a global region of another layer. For example, a first opacity layer may provide real-world light blocking in a local region of the first layer, and a second opacity layer may provide real-world light blocking in a larger, global region of the second layer.

In some examples, the light transmission provided by the opacity layer 410 may range from approximately full transmission (for example, approximately 100% of light entering the opacity layer is transmitted through and exits the opacity layer) to approximately zero transmission (for example, approximately 0% of light entering the opacity layer exits the opacity layer). In other examples, the light transmission of the opacity layer 410 may range between approximately 1.0% to 98%, 20% to 80%, or other suitable ranges provided by the materials utilized in the opacity layer.

Individual pixels in the opacity layer 410 may support various levels of darkness or color depth. In some examples, individual pixels may have 4, 8, 64, 128 or other suitable numbers of levels of darkness. Additionally, the refresh rate of individual pixels may be 60 Hz, 30 Hz, or other suitable refresh rate. For liquid crystal materials, the state of each pixel between refresh scans may be maintained via passive matrix or active matrix solutions.

In some examples, an opacity resolution of the opacity layer 410 may be less than a display resolution of the display optics 56 including the light guide 406. For example, the opacity resolution of the opacity layer 410 may be 1/64th of the display resolution, 1/16th of the display resolution, or other suitable fraction of the display resolution.

In some examples, the opacity layer 410 may have a thickness of approximately 1 mm, approximately 0.5 mm, or other suitable thickness. With reference to FIG. 2, the opacity layer 410 within the visor 60 may also be curved around the outer surface of the transparent display 54.

With reference again to FIG. 4, the light guide 406 may project light rays 418 forming an eyebox 430 in which a virtual image, such as the virtual globe 320, is formed. The virtual image may be viewed by the user's eye 402 while the user's eye is located within the eyebox 430. In this case and as illustrated in FIG. 4, the virtual image is viewable by the user's eye 402 in a field of view (FOV) 434. The virtual image may not be viewable by the user's eye 402 when the user's eye is located outside of the eyebox 430. Additionally, and as explained in more detail below, a position of the user's eye 402 within the eyebox 430 may be used to adjust the location of the blocking image 422 in the opacity layer 410.

Figure 5:
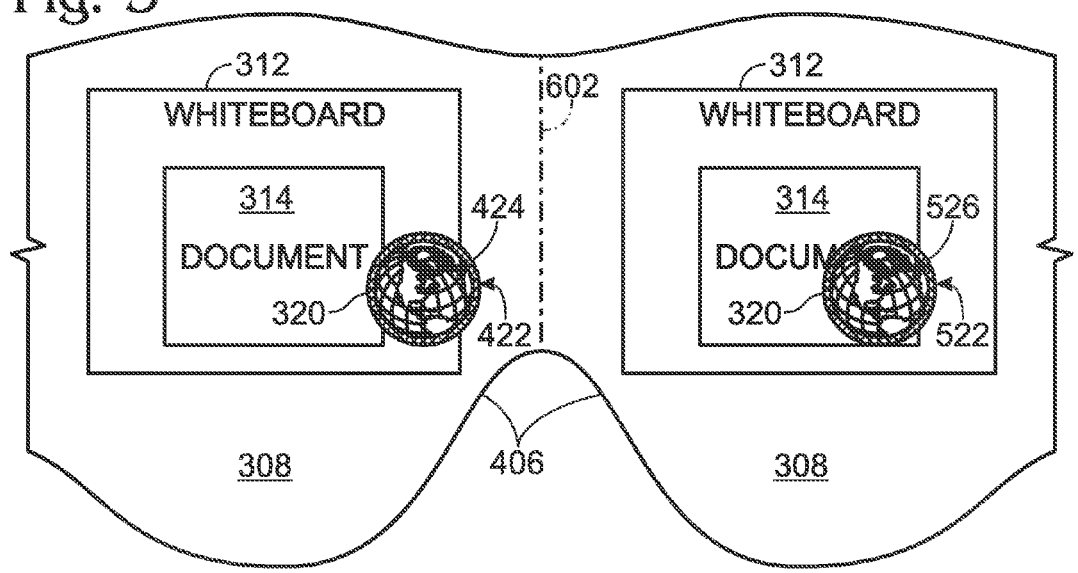
FIG. 5 is a schematic view of the physical environment of FIG. 3 as seen through the head-mounted display device of FIG. 3 and showing a virtual globe in a first position.
Figure 6:
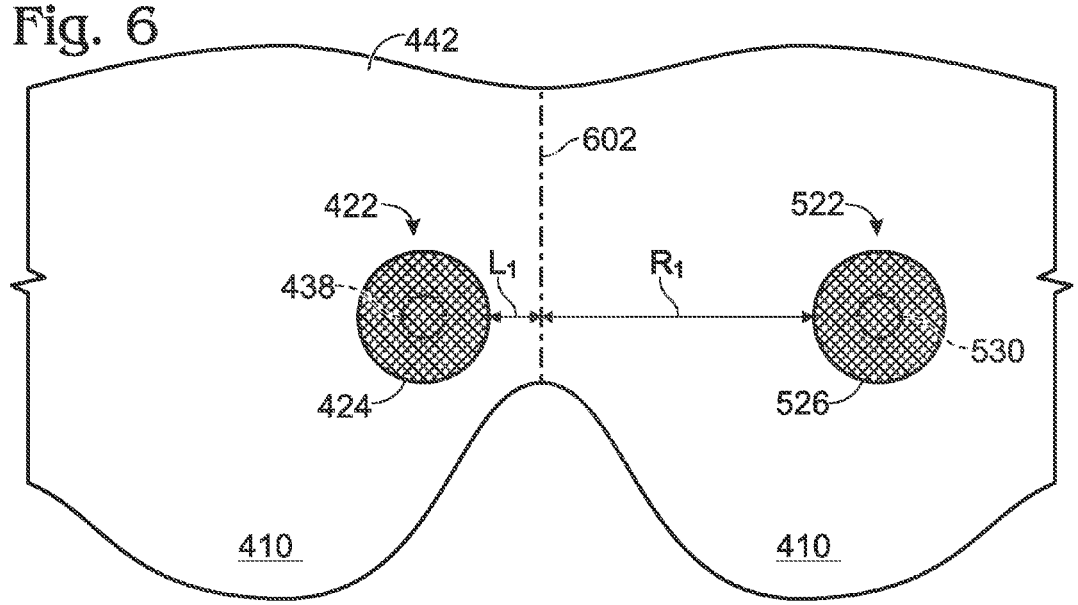
FIG. 6 is a schematic view of the opacity layer in the head-mounted display device of FIG. 5.

FIG. 5 shows a view of the physical environment 300 of FIG. 3 as seen by each eye of the user 304 through the head-mounted display device 200, including the virtual globe 320 in the first position. FIG. 6 is a schematic view of the opacity layer 410 in the head-mounted display device of FIG. 5, including blocking images 422 and 522 as discussed in more detail below. The two images of the virtual globe 320 presented in FIG. 5 represent the separate images displayed to the user's left eye 402 and right eye 404 (see FIG. 9) prior to the user's binocular vision system processing the two images into a single image. It will be appreciated that due to binocular disparity, the perceived position of the virtual globe 320 is different for the user's left eye 402 and right eye 404.

In this example, the virtual globe 320 is rendered by the virtual image generating program 34 and presented by the light guide 406 as positioned between the user 304 and the whiteboard 312 and document 314. The whiteboard 312 and/or document 314 may be brightly colored and have high contrast as compared to the image of the virtual globe 320. Lighting information from the physical environment 300, including lighting information associated with the whiteboard 312 and document 314, may be captured by the optical sensor system 70 in the HMD device 200.

With reference also to FIG. 9, one or more eye-position parameters may be measured by the eye-tracking system 66. As noted above, such eye-position parameters may include a position of the user's eye within eyebox 430, an IPD of the user's eyes 402, 404 (see FIGS. 9 and 10), a distance from the center of the pupil of each of the user's eyes 402, 404 to a center or midpoint of an HMD device 200, such as bisector 602 of the opacity layer 410 (see FIG. 5), and/or a line of sight 906, 910 of the user's eyes.

In other examples, such as where the HMD device 200 does not include an eye-tracking system, the blocking image generating program 14 may estimate one or more eye-position parameters. For example, an IPD of the user's eyes 402 and 404 may be estimated by referencing an anthropometric database that provides sample IPD values based on, for example, gender. Such estimated values may be stored in mass storage 18 of the computing device 22 and accessed by the blocking image generating program 14 as needed.

In other examples, a line of sight 906 of the user's left eye 402 and a line of sight 910 of the user's right eye 404 may be estimated using position information from the position sensor system 74. Such position information may include, for example, a position and/or orientation of the user's head, and may be combined with the position of the virtual globe 320 relative to the HMD device 200.

With reference to FIGS. 5 and 6, to enhance the visual contrast between the virtual globe 320 and the whiteboard 312 and document 314, the blocking image generating program 14 may generate one or more blocking images in the opacity layer 410, such as blocking images 422 and 522. For example, the blocking image generating program 14 may locate the blocking image 422 behind the virtual globe 320 as viewed by the user's left eye 402. In this manner, the blocking image 422 may block a selected portion of real-world light rays received from the whiteboard 312 and document 314 in the area occupied by the virtual globe 320. Similarly, the blocking image generating program 14 may locate the blocking image 522 behind the virtual globe 320 as viewed by the user's right eye 404. Advantageously, the blocking image generating program 14 may thereby enable a more realistic and "solid" image of the virtual globe 320 to be perceived by the user 304.

A location of the blocking images 422 and 522 in the opacity layer 410 may be determined based on one or more eye-position parameters, as described above. In one example, and with reference to FIG. 9, the eye-tracking system 66 may determine the line of sight 906 of the user's left eye 402 and the line of sight 910 of the user's right eye 404. The line of sight 906 may form an angle $\theta_1$ with respect to a plane containing the visor 60 and opacity layer 410. Using this information along with a measured or calculated IPD $D_1$, a location of blocking image 422 and blocking image 522 in the opacity layer 410 may be determined.

The blocking images 422 and 522 may also be generated based on the lighting information received from the optical sensor system 70 and the virtual image of the virtual globe 320. For example, an opacity of the blocking image 422 and/or blocking image 522 may be determined based on the intensity of the whiteboard 312 and document 314 behind the virtual globe 302, and/or the intensity of the virtual image of the virtual globe 320. In another example, an opacity of the blocking image 422 and/or blocking image 522 may be adjusted based on a change in the intensity of the whiteboard 312 and document 314 behind the virtual globe 302, and/or a change in the intensity of the virtual image of the virtual globe 320.

With reference to FIGS. 5 and 6, in one example the blocking image 422 may be larger than the virtual image of the virtual globe 320 as viewed by the user 304. A peripheral portion 424 of the blocking image 422 may extend beyond an edge 324 of the virtual globe 320 around the circumference of the globe (see also FIG. 3). In this manner, the virtual globe 320 may be further contrasted with the whiteboard 312 and document 314 behind the globe. Similarly, a peripheral portion 526 of the blocking image 522 may extend beyond an edge 324 of the virtual globe 320 as viewed by the right eye 404 of the user 304. In other examples including virtual images having different shapes, a blocking image may be generated that corresponds to the shape of the virtual image. In these examples, a peripheral portion of the blocking image may similarly extend beyond a peripheral edge of the virtual image shape. In some examples a virtual image may be standing on or resting against a real-world object. In these examples, a blocking image may extend beyond the virtual image in areas adjacent to the real-world object to help "ground" the virtual object in the physical environment.

In another example, the blocking image 422 may include a first opacity in a center portion 438 of the blocking image and a second opacity that is less than the first opacity in a peripheral portion 424 of the blocking image. In this manner, a greater percentage of real-world light may be blocked in the center portion 438 than in the peripheral portion. This may enhance the contrast of the virtual globe 320 against the whiteboard 312 and document 314, while also creating a realistic and somewhat see-through shadow around the periphery of the virtual globe 320. In other examples, the blocking image 422 may include a first opacity in the center portion 438 that is less than a second opacity in the peripheral portion 424. In this manner, a "window" may be created into the real-world physical environment 300 through the center portion 438 with the peripheral portion 424 blocking a greater portion of real-world light.

The blocking image generating program 14 may also adjust a location of a blocking image in the opacity layer 410 based on one or more eye-position parameters. With reference to FIG. 3, in one example the virtual globe 320 may move from a first position to a second position that is closer to the user 304, indicated by the virtual globe 320'. With reference now to FIGS. 7, 9 and 10, the virtual globe 320' in the second position will appear larger to the user 304, relative to the transparent display 54 and opacity layer 410, than the virtual globe 320 in the first position that is farther away from the user. Additionally, because the virtual globe 320' is closer to the right eye 404 of the user 304, the virtual globe 320' will appear larger to the right eye than to the left eye 402.

It will be appreciated that as the virtual globe 320 moves from the first position to the second position closer to the user 304, the user's left eye 402 and right eye 404 may toe in toward the user's nose and toward a bisector 602 of the opacity layer 410 as the user's eyes focus on the virtual globe 320' in the second position. It will also be appreciated that as the user's left eye 402 and right eye 404 toe in, the position of the left eye and the right eye relative to the opacity layer 410 will change. In one example, the bisector 602 of the opacity layer 410 may be a line that divides the opacity layer into substantially equal halves corresponding to left and right sides of the transparent display 54.

With reference to FIGS. 9 and 10, as the user's left eye 402 and right eye 404 toe in, the user's IPD will decrease such that $D_2$ is less than $D_1$. Additionally, the user's line of sight 906 may form an angle $\theta_2$ with respect to the plane containing the opacity layer 410 in visor 60, where $\theta_2$ is greater than $\theta_1$. Based on the decreasing IPD of the user 304 and/or the increasing angle between the user's line of sight and the plane containing the opacity layer 410 in visor 60, the blocking image generating program 14 may move the blocking image 422 from its position in FIG. 6 at a distance $L_1$ from the bisector 602 to its position in FIG. 8 at a distance $L_2$ from the bisector (indicated by blocking image 422'), where $L_2$ is less than $L_1$. Similarly, the blocking image generating program 14 may move the blocking image 522 from its position in FIG. 6 at a distance $R_1$ from the bisector 602 to its position in FIG. 8 at a distance $R_2$ from the bisector (indicated by blocking image 522'), where $R_2$ is less than $R_1$. In this manner, the location of the blocking images 422 and 522 may be adjusted to compensate for the relative movement between the user's left eye 402 and right eye 404, respectively, and the opacity layer 410.

It will also be appreciated that relative movement between the user's left eye 402 and right eye 404 and the opacity layer 410 may occur in directions and manners other than toeing inward, such as, for example, looking upward, downward, to one side, etc. In these other examples, the location of the blocking images 422 and 522 may be similarly adjusted to compensate for the relative movement between the user's left eye 402 and right eye 404, respectively, and the opacity layer 410.

In some examples, the HMD device 200 may move relative to the left eye 402 and right eye 404 of the user 304. For example, the user 304 may adjust the position of the HMD device 200 on the user's nose, or may squint or move suddenly to cause the HMD device to move on the user's face. In such cases, relative movement between the user's left eye 402 and right eye 404 and the opacity layer 410 will occur. In such examples, the blocking image generating program 14 may use one or more eye-position parameters and information corresponding to the position of the HMD device 200 to determine an adjusted position for blocking image 422 and blocking image 522. The blocking image generating program 14 may then move the blocking images 422 and 522 to compensate for the movement of the HMD device 200, and associated opacity layer 410, relative to the user's left eye 402 and right eye 404, respectively. In this manner, the location of the blocking images 422, 522 may be adjusted to compensate for the relative movement of the between the user's left eye 402 and right eye 404, respectively, and the opacity layer 410.

It will also be appreciated that the user's left eye 402 may move independently of the user's right eye 404, and vice versa. Accordingly, the location of the blocking image 422 may be adjusted to compensate for the relative movement between the user's left eye 402 and the opacity layer 410. Similarly, the location of the blocking image 522 may be adjusted to compensate for the relative movement between the user's right eye 404 and the opacity layer 410.

As noted above, blocking images may be generated by activating one or more local regions of the opacity layer 410, such as the region defined by the blocking image 422 corresponding to the virtual globe 320. Blocking images may also be generated by activating a global region 442 of the opacity layer 410 that is larger than a local region. Such a global region 442 may cover all, substantially all, or a significant portion of the opacity layer 410. In some examples, all of the opacity layer 410 may correspond to approximately 100% of the area of the opacity layer, substantially all of the opacity layer may correspond to approximately 98%-99.5% of the area of the opacity layer, and a significant portion of the opacity layer may correspond to 90%-97.5% of the area of the opacity layer.

With reference to FIG. 6, in one example a local region of the opacity layer 410 may correspond to the blocking image 422 and a global region 442 of the opacity layer may correspond a region covering 100% of the area of the opacity layer. The global region 442 of the opacity layer 410 may be activated to block a first percentage of real-world light from reaching the left eye 402 and right eye 404 of the user 304. In one example, the global region 442 of the opacity layer 410 may reduce the luminance of the real-world light transmitted through the global region by approximately 15%. It will be appreciated that the global region 442 of the opacity layer 410 may be activated to reduce the luminance of real-world light by other amounts including, but not limited to, 5%, 10%, 20%, 25% and other suitable amounts.

The local region (blocking image 422) may be activated to block a second percentage of real-world light from reaching the left eye 402 of the user 304. In one example, the blocking image 422 may reduce the luminance of the real-world light transmitted through the blocking image by an amount greater than the amount of real-world light reduced by the global region 442. In one example, the blocking image 422 may reduce the luminance of the real-world light transmitted through the blocking image by approximately 100%. It will be appreciated that the blocking image 422 may be activated to reduce the luminance of real-world light by other amounts including, but not limited to, approximately 95%, 90%, 85%, 80% and other suitable amounts. It will also be appreciated that one or more additional local regions of the opacity layer 410, such as blocking image 522, may also be activated to block a second percentage of real-world light.

In one example, a single opacity layer 410 may include the global region 442 and the blocking image 422 (local region). In this example, the global region 442 and the blocking image 422 may be activated simultaneously. In other examples, the HMD device 200 may include a second opacity layer in addition to the opacity layer 410. In these examples, the opacity layer 410 may include the global region 442 that may be activated, and the additional, second opacity layer may include one or more local regions that may be activated to generate blocking images, such as blocking image 422.

With reference again to FIG. 3, in one use case example the virtual globe 320 may quickly move to the right of the user 304 and stop in front of the window 316. The user 304 may follow the virtual globe 320 and quickly shift his gaze to look at the virtual globe 320 in front of the window 316. Sunlight may be streaming in from the window 316 and producing a background light behind the virtual globe 320 that is much brighter than the background light produced by the whiteboard 312.

In this example, as the user 304 turns to look toward the window 316, the optical sensor system 70 of the HMD device 200 may sense the change in background light behind the virtual globe 320. Using this lighting information, the blocking image generating program 14 may increase the opacity of the global region 442 of the opacity layer 410 to increase the percentage of real-world light that is blocked by the global region. Similarly, the blocking image generating program 14 may increase the opacity of the blocking image 422 to increase the percentage of real-world light that is blocked by the blocking image 422. In this manner, the visual contrast between the virtual globe 320 and the window 316 may be enhanced.

Additionally, by increasing the opacity of the global region 442 of the opacity layer 410 to block more real-world light, an intensity of light used to generate the virtual globe 320 may be reduced, while still providing appropriate contrast with the window 316. Advantageously, reducing the intensity of light used to generate the virtual globe 320 may correspondingly reduce the power requirements of the HMD device 200.

In other examples, an intensity of the virtual globe 320 may be changed or varied. For example, the intensity of the virtual globe 320 may be increased to simulate the sun shining on a portion of the globe. In this example, the percentage of real-world light that is blocked by the global region 442 of the opacity layer 410 may be adjusted based on the change in the intensity of the virtual globe 320. Similarly, the percentage of the real-world light that is blocked by the blocking image 422 may be adjusted based on the change in the intensity of the virtual globe 320.

In other examples, a physical environment may have two or more virtual images that each have different opacity settings in local regions of the opacity layer 410. Each opacity layer local region that corresponds to a virtual image may be controlled and activated independently of the other local regions. In one example, the percentage of real-world light blocked by a particular local region may be determined based on the percentage of real-world light that is blocked by the global region 442 of the opacity layer 410, and without reference to the percentage of real-world light blocked by other local regions.

In some examples, a first local region may be activated to provide full opacity (i.e., to block approximately 100% of real-world light) for a first virtual object to provide significant contrast between the first virtual object and the physical environment. A second local region may be activated to provide less than full opacity (i.e., to block less than 100% of real-world light) for a second virtual object. For example, a local region corresponding to a virtual glass table may block approximately 0% of real-world light to realistically allow such light to pass through the table.

In other examples where a global region of the opacity layer 410 is activated to block a first percentage of real-world light, a local region within the global region may be activated to block a second percentage of real-world light that is less than the first percentage. In this manner, the local region may be brightened as compared to the rest of the global region. In one example, virtual light may be generated and cast into a physical environment such that the virtual light is received by a defined area in the physical environment. In this example, a local region of the opacity layer 410 that corresponds to the area receiving the virtual light may be brightened to create the effect of the virtual light on the area receiving the light.

It will also be appreciated the pupillary response reaction will cause the pupils of the user's eyes 402 and 404 to constrict as the user 304 shifts his gaze to the brighter background of the window 316. Such pupillary response will not be instantaneous, but will occur at a rate that depends upon a magnitude of intensity change, an age of the user, etc. To provide a realistic opacity increase in the global region 442 of the opacity layer 410, and avoid an unnatural, sudden dimming of the physical environment 300, the percentage of real-world light that is blocked by the global region 442 of the opacity layer 410 may be adjusted at an adjusting rate that corresponds to a pupillary response rate of the user 304. Similarly, the percentage of real-world light that is blocked by the blocking image 422 of the opacity layer 410 may be adjusted at an adjusting rate that corresponds to a pupillary response rate of the user 304.

In some examples, the display optics 56 of the transparent display 54 may introduce distortions into the virtual image 38 generated by the virtual image generating program 34. To compensate for such distortions, the virtual image 38 may be warped or distorted in a manner inverse to distortions introduced by the display optics 56. In this manner, the virtual image as displayed and viewed by the user 304, such as virtual globe 320, may correspond to the virtual image 38 that is generated.

In other examples, a real-world object may occlude all or a portion of a virtual image. In one example and with reference to FIG. 3, the user 304 may raise his left hand 306 between the HMD device 200 and the virtual globe 320. In this position, the user's left hand 306 is in front of a portion of the virtual globe 320 from the viewpoint of the user. The virtual image generating program 34 may accordingly alter the display of the virtual globe 320 such that the portions of the globe behind the user's left hand 306 are not displayed via the transparent display 54.

As described above, a blocking image, such as blocking image 422, may be generated to block a selected portion of real-world light rays in the area occupied by the virtual globe 320. In this example, a portion of the blocking image that corresponds to the portions of the virtual globe 320 that are not displayed may be removed from the opacity layer 410. In this manner, a more realistic perception of the user's left hand 306, virtual globe 320 and physical environment 300 may be provided.

In other examples, one or more local regions of an opacity layer may be activated without utilizing an eye-tracking system or eye-position parameters. For example, general regions of an opacity layer corresponding to general regions of a transparent display may be activated. In one example, outer peripheral edges of an opacity layer may correspond to outer peripheral edges of a transparent display where menu icons or status data may be displayed at times. These outer peripheral edges of the opacity layer may be activated independent of eye-tracking parameters to enhance viewing of the corresponding general regions of the transparent display.

Figure 11B:
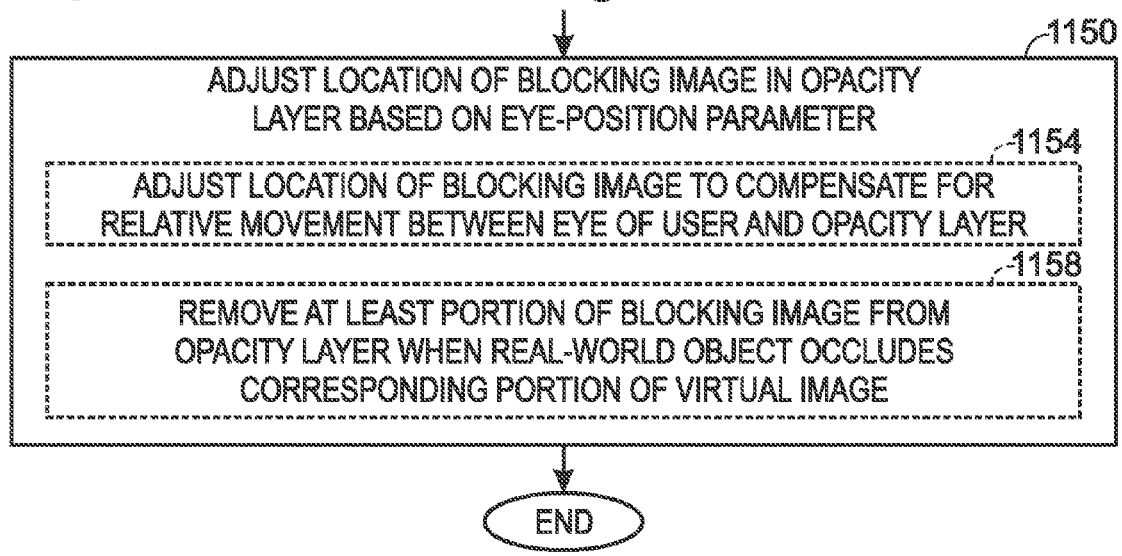

FIGS. 11A and 11B illustrate a flow chart of a method 1100 for adjusting a location of a blocking image in an opacity layer located in a head-mounted display device worn by a user. The following description of method 1100 is provided with reference to the software and hardware components of the blocking image generating system 10 described above and shown in FIGS. 1-10. It will be appreciated that method 1100 may also be performed in other contexts using other suitable hardware and software components.

With reference to FIG. 11A, at 1102 the method 1100 may include receiving a virtual image to be presented by the display optics 56 of the HMD device 200. In one example, at 1106 the display optics 56 may comprise a light guide, such as light guide 406. At 1110 the method 1100 may include receiving lighting information from an optical sensor system in the HMD device 200. At 1114 the method may include receiving an eye-position parameter. In some examples, at 1118 the eye-position parameter may comprise an estimated IPD and/or an estimated line of sight of the user 304. In other examples, at 1122 the eye-position parameter may comprise a measured interpupillary distance and/or a measured line of sight of the user 304. In still other examples, at 1126 the eye-position parameter may comprise a position of an eye of the user 304 within an eyebox 430 formed by the display optics 56.

At 1130 the method 1100 may include generating a blocking image, such as blocking image 422 or blocking image 522, in the opacity layer 410 of the HMD device 200 based on lighting information received by the optical sensor system and the virtual image generated by the virtual image generating program 34. In one example, at 1134 the opacity resolution of the opacity layer 410 may be less than a display resolution of the display optics 56. In another example, at 1138 the method 1100 may include adjusting an opacity of the blocking image based on a change in the lighting information and/or a change in an intensity of the virtual image.

In another example, at 1142 the blocking image may be larger than the virtual image from the viewpoint of, or as perceived by, the user, such that a peripheral portion of the blocking image extends beyond an edge of the virtual image. In another example, at 1146 the blocking image may include a first opacity in a center portion of the blocking image and a second opacity that is less than the first opacity in a peripheral portion of the blocking image.

At 1150 the method 1100 may include adjusting the location of the blocking image in the opacity layer 410 based on one or more of the eye-position parameters. At 1154, the method may include adjusting the location of the blocking image in the opacity layer 410 to compensate for relative movement between the eye of the user and the opacity layer. At 1158, the method may also include removing at least a portion of the blocking image from the opacity layer when a real-world object occludes a corresponding portion of the virtual image.

Figure 12A:
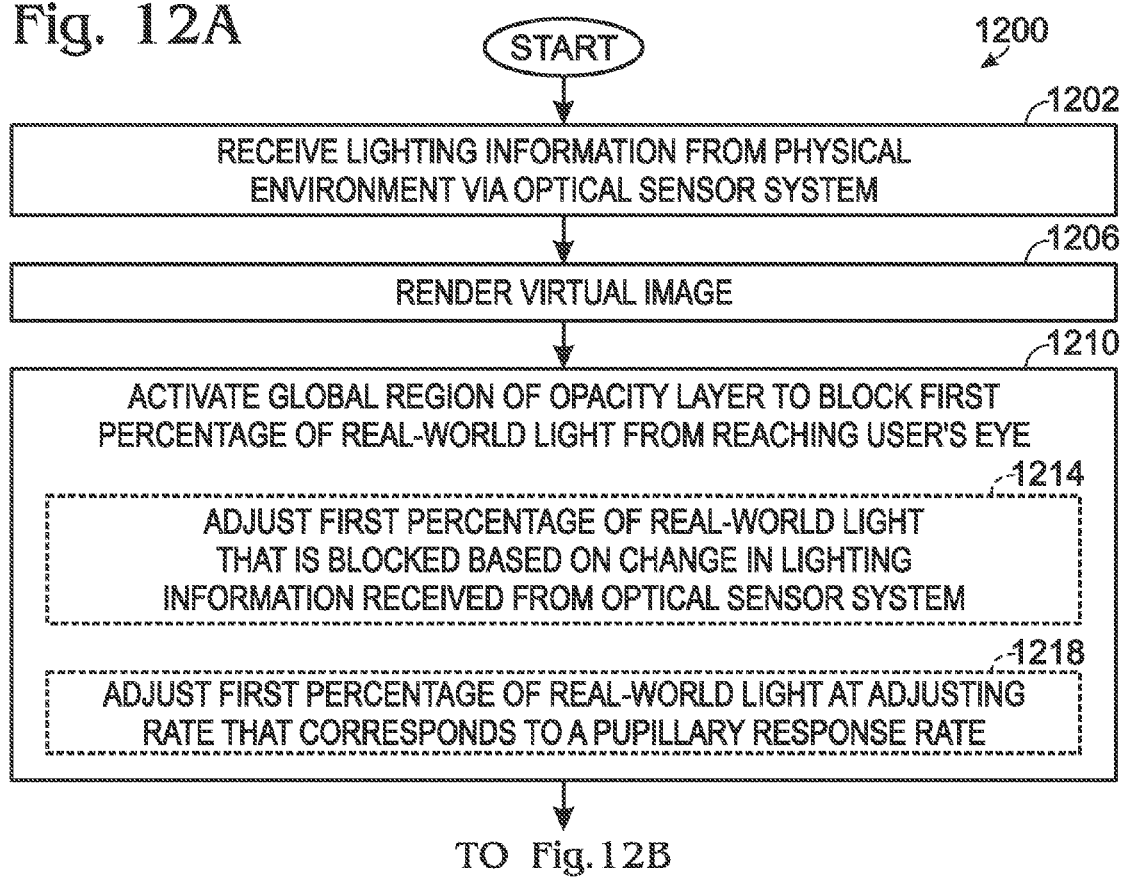
FIGS. 12A and 12B are a flow chart of a method for enhancing a visual contrast between a virtual image and a physical environment according to an embodiment of the present disclosure.
Figure 12B:
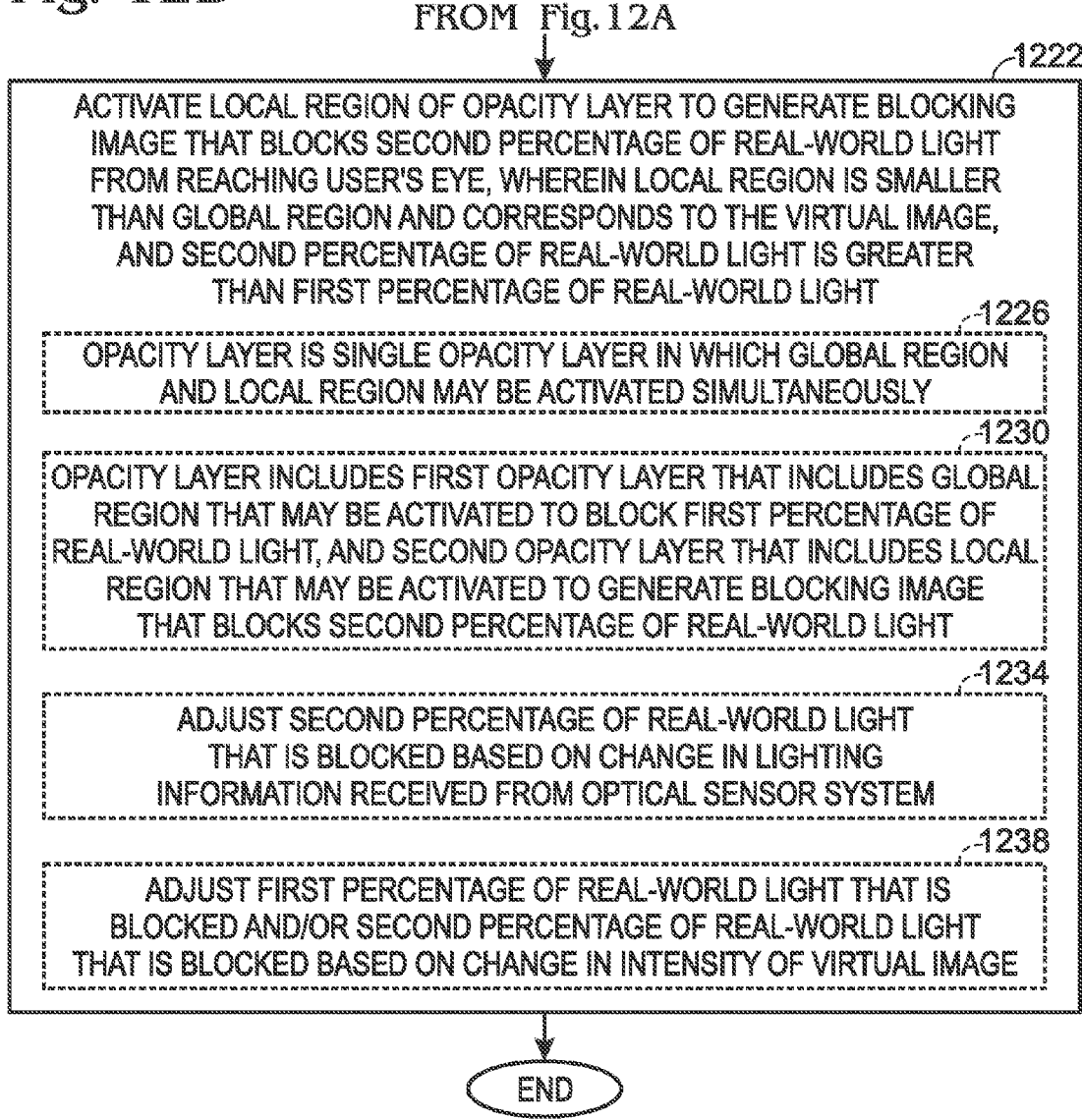

FIGS. 12A and 12B illustrate a flow chart of a method 1200 for enhancing a visual contrast between a virtual image and a physical environment that includes real-world light, where the virtual image is presented by display optics in a head-mounted display device worn by a user. The following description of method 1200 is provided with reference to the software and hardware components of the blocking image generating system 10 described above and shown in FIGS. 1-10. It will be appreciated that method 1200 may also be performed in other contexts using other suitable hardware and software components.

At 1202 the method 1200 may include receiving lighting information from the physical environment via an optical sensor system in the HMD device 200. At 1206 the method 1200 may include rendering a virtual image. At 1210 the method 1200 may include activating a global region of an opacity layer, such as global region 442 in opacity layer 410, to block a first percentage of real-world light from reaching an eye of the user 304.

At 1214, the method 1200 may include adjusting the first percentage of the real-world light that is blocked by the global region 442 of the opacity layer 410 based on a change in the lighting information received via the optical sensor system. At 1218 the method 1200 may include adjusting the first percentage of the real-world light that is blocked by adjusting the first percentage at an adjusting rate that corresponds to a pupillary response rate.

At 1222 the method 1200 may include activating a local region of the opacity layer 410 to generate a blocking image, such as blocking image 422, that blocks a second percentage of real-world light from reaching the eye of the user 304. In this example, the local region may be smaller than the global region and may correspond to the virtual image. Further, the second percentage of real-world light that is blocked in the local region may be greater than the first percentage of real-world light that is blocked in the global region.

In one example, at 1226 the single opacity layer 410 may include both the global region and the local region which may both be activated simultaneously. In another example, at 1230 the global region may be included in the opacity layer 410, and the HMD device 200 may include a second opacity layer that includes the local region that may be activated independently from and/or in coordination with the first opacity layer 410 to generate the blocking image 422.

At 1234, in one example the method 1200 may include adjusting the first percentage of real-world light that is blocked by the local region of the opacity layer based on a change in the lighting information received via the optical sensor system. At 1238, in another example the method 1200 may include adjusting the first percentage of real-world light and/or the second percentage of the real-world light based on a change in the intensity of the virtual image that is presented by the display optics 56 of the HMD device 200.

Figure 13:
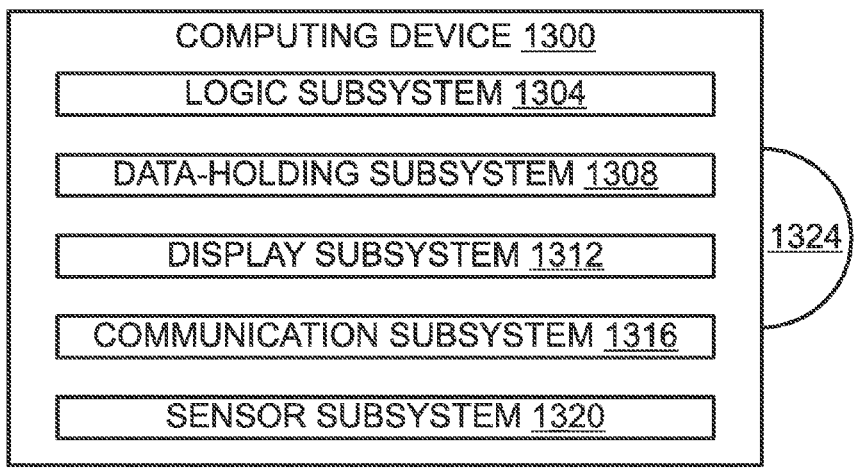
FIG. 13 is a simplified schematic illustration of an embodiment of a computing device.

FIG. 13 schematically shows a nonlimiting embodiment of a computing device 1300 that may perform one or more of the above described methods and processes. Computing device 1300 is shown in simplified form. It is to be understood that virtually any computer architecture may be used without departing from the scope of this disclosure. In different embodiments, computing device 1300 may take the form of a mainframe computer, server computer, desktop computer, laptop computer, tablet computer, home entertainment computer, network computing device, mobile computing device, mobile communication device, gaming device, etc.

As shown in FIG. 13, computing device 1300 includes a logic subsystem 1304, a data-holding subsystem 1308, a display subsystem 1312, a communication subsystem 1316, and a sensor subsystem 1320. Computing device 1300 may optionally include other subsystems and components not shown in FIG. 13. Computing device 1300 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1304 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1304 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1308 may include one or more physical, non-transitory devices configured to hold data and/or instructions executable by the logic subsystem 1304 to implement the herein described methods and processes.

When such methods and processes are implemented, the state of data-holding subsystem 1308 may be transformed (e.g., to hold different data).

Data-holding subsystem 1308 may include removable media and/or built-in devices. Data-holding subsystem 1308 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1308 may include devices with one or more of the following characteristics: volatile, nonvolatile, dynamic, static, read/write, read-only, random access, sequential access, location addressable, file addressable, and content addressable. In some embodiments, logic subsystem 1304 and data-holding subsystem 1308 may be integrated into one or more common devices, such as an application specific integrated circuit or a system on a chip.

FIG. 13 also shows an aspect of the data-holding subsystem 1308 in the form of removable computer-readable storage media 1324, which may be used to store and/or transfer data and/or instructions executable to implement the methods and processes described herein. Removable computer-readable storage media 1324 may take the form of CDs, DVDs, HD-DVDs, Blu-Ray Discs, EEPROMs, and/or floppy disks, among others.

It is to be appreciated that data-holding subsystem 1308 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 1312 may be used to present a visual representation of data held by data-holding subsystem 1308. Display subsystem 1312 may include, for example, the transparent display 54, display optics 56 including light guide 406, visor 60, and opacity layer 410 of the HMD device 200. As the above described methods and processes change the data held by the data-holding subsystem 1308, and thus transform the state of the data-holding subsystem, the state of the display subsystem 1312 may likewise be transformed to visually represent changes in the underlying data. The display subsystem 1312 may include one or more display devices utilizing virtually any type of technology. Such display devices may be combined with logic subsystem 1304 and/or data-holding subsystem 1308 in a shared enclosure, or such display devices may be peripheral display devices.

Communication subsystem 1316 may be configured to communicatively couple computing device 1300 with one or more networks and/or one or more other computing devices. Communication subsystem 1316 may include wired and/or wireless communication devices compatible with one or more different communication protocols. As nonlimiting examples, the communication subsystem 1316 may be configured for communication via a wireless telephone network, a wireless local area network, a wired local area network, a wireless wide area network, a wired wide area network, etc. In some embodiments, the communication subsystem may allow computing device 1300 to send and/or receive messages to and/or from other devices via a network such as the Internet.

Sensor subsystem 1320 may include one or more sensors configured to sense different physical phenomenon (e.g., visible light, infrared light, sound, acceleration, orientation, position, etc.) as described above. For example, the sensor subsystem 1320 may comprise one or more eye-tracking sensors, image sensors, microphones, motion sensors such as accelerometers, touch pads, touch screens, and/or any other suitable sensors. Sensor subsystem 1320 may be configured to provide observation information to logic subsystem 1304, for example. As described above, observation information such as eye-tracking information, image information, audio information, ambient lighting information, depth information, position information, motion information, and/or any other suitable sensor data may be used to perform the methods and processes described above.

In some embodiments, sensor subsystem 1320 may include a depth camera (e.g., outward facing sensor 212 of FIG. 2). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots) onto a scene, such as the physical environment 300 shown in FIG. 3. The depth camera may be configured to image the structured illumination reflected from the scene. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination. The integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 1320 may include a visible light camera, such as a digital camera. Virtually any type of digital camera technology may be used without departing from the scope of this disclosure. As a non-limiting example, the visible light camera may include a charge coupled device image sensor.

The term "program" may be used to describe an aspect of the blocking image generating system 10 that is implemented to perform one or more particular functions. In some cases, such a program may be instantiated via logic subsystem 1304 executing instructions held by data-holding subsystem 1308. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method comprising:
receiving a virtual image to be presented by display optics;
receiving lighting information from an optical sensor system;
receiving an eye-position parameter;
generating a blocking image in an opacity layer based on the lighting information and the virtual image, the blocking image preventing a portion of real-world light from reaching the display optics;
adjusting a location of the blocking image in the opacity layer based on the eye-position parameter; and
adjusting an opacity of the blocking image at an adjusting rate that corresponds to a pupillary response rate.

2. The method of claim 1, wherein the eye-position parameter comprises an estimated interpupillary distance and/or an estimated line of sight of a user.

3. The method of claim 1, wherein the eye-position parameter comprises a measured interpupillary distance and/or a measured line of sight of a user.

4. The method of claim 1, wherein the eye-position parameter comprises a position of an eye of a user within an eyebox formed by the display optics.

5. The method of claim 1, wherein adjusting the location of the blocking image in the opacity layer further comprises adjusting the location of the blocking image to compensate for relative movement between an eye of a user and the opacity layer.

6. The method of claim 1, further comprising removing at least a portion of the blocking image from the opacity layer when a real-world object occludes a corresponding portion of the virtual image.

7. The method of claim 1, wherein an opacity resolution of the opacity layer is less than a display resolution of the display optics.

8. The method of claim 1, wherein the display optics comprise a light guide.

9. The method of claim 1, further comprising adjusting an opacity of the blocking image based on a change in the lighting information and/or a change in an intensity of the virtual image.

10. The method of claim 1, wherein the blocking image is larger than the virtual image from a viewpoint of a user such that a peripheral portion of the blocking image extends beyond an edge of the virtual image.

11. The method of claim 1, wherein the blocking image includes a first opacity in a center portion of the blocking image and a second opacity that is less than the first opacity in a peripheral portion of the blocking image.

12. A method comprising:
receiving lighting information from a physical environment via an optical sensor system;
rendering a virtual image on a display;
activating a global region of at least one opacity layer to block a first percentage of ambient light from reaching the display;
activating a local region of at least one opacity layer to generate a blocking image that blocks a second percentage of ambient light from reaching the display, wherein the local region is smaller than the global region and corresponds to the virtual image, and the second percentage of ambient light that is blocked in the local region is greater than the first percentage of ambient light that is blocked in the global region; and
adjusting the first percentage of ambient light that is blocked by the global region of the at least one opacity layer at an adjusting rate that corresponds to a pupillary response rate.

13. The method of claim 12, wherein the at least one opacity layer is a single opacity layer in which the global region may be activated and the local region may be activated simultaneously.

14. The method of claim 12, wherein the at least one opacity layer is a first opacity layer that includes the global region that may be activated to block the first percentage of ambient light, and further including a second opacity layer that includes the local region that may be activated to generate a blocking image that blocks the second percentage of the real-world light from reaching the eye of the user.

15. The method of claim 12, further comprising adjusting the second percentage of the ambient light that is blocked by the local region of the at least one opacity layer based on a change in the lighting information received via the optical sensor system.

16. The method of claim 12, further comprising adjusting the first percentage of the ambient light that is blocked by the global region of the at least one opacity layer and/or adjusting the second percentage of the ambient light that is blocked by the local region of the at least one opacity layer based on a change in an intensity of the virtual image.

17. A system comprising:
a display comprising:
display optics; and
at least one opacity layer;
an optical sensor; and
a processor in communication with the display and the optical sensor, the processor configured to:
receive a virtual image to be presented by the display optics;
receive lighting information from the optical sensor;
activate a global region of the at least one opacity layer to block a first percentage of ambient light from reaching an eye of a user;
receive an eye-position parameter;
activate a local region of the at least one opacity layer to generate a blocking image that blocks a second percentage of the ambient light from reaching the eye of the user, wherein the local region is smaller than the global region and corresponds to the virtual image, and the second percentage of the ambient light that is blocked in the local region is greater than the first percentage of ambient light that is blocked in the global region;
adjust a location of the blocking image in the at least one opacity layer based on the eye-position parameter; and
adjust an opacity of the blocking image at an adjusting rate that corresponds to a pupillary response rate.

18. The system of claim 17, wherein the processor is further configured to adjust an opacity of the blocking image based on a change in the lighting information and/or a change in an intensity of the virtual image.

* * * * *